(12) United States Patent
Lee et al.

(10) Patent No.: US 8,749,137 B2
(45) Date of Patent: Jun. 10, 2014

(54) LIGHTING DEVICE AND LIGHT CONTROL COMPONENT THEREOF

(71) Applicant: MaxEmil Photonics Corporation, New Taipei (TW)

(72) Inventors: Hung-Te Lee, New Taipei (TW); Yi-Hao Chen, New Taipei (TW)

(73) Assignee: MaxEmil Photonics Corporation, New Taipei (TW)

( * ) Notice: Subject to any disclaimer, the term of this patent is extended or adjusted under 35 U.S.C. 154(b) by 0 days.

(21) Appl. No.: 13/739,570

(22) Filed: Jan. 11, 2013

(65) Prior Publication Data
US 2013/0320843 A1 Dec. 5, 2013

(30) Foreign Application Priority Data

May 29, 2012 (TW) .............................. 101210234 U

(51) Int. Cl.
*H01J 1/62* (2006.01)

(52) U.S. Cl.
USPC .......................................... 313/512; 313/110

(58) Field of Classification Search
USPC ............................ 313/512, 506, 498; 362/309
See application file for complete search history.

(56) References Cited

U.S. PATENT DOCUMENTS

| | | | | |
|---|---|---|---|---|
| 6,632,004 B2 * | 10/2003 | Sugawara et al. | ............. | 362/281 |
| 6,997,571 B2 * | 2/2006 | Tenmyo | .......................... | 362/16 |
| 8,292,466 B2 * | 10/2012 | Huang | .......................... | 362/309 |

* cited by examiner

*Primary Examiner* — Vip Patel
(74) *Attorney, Agent, or Firm* — Faegre Baker Daniels LLP

(57) ABSTRACT

A lighting device includes a base, a light emitting component operable to generate light, and a light control component cooperating with the base to enclose the light emitting component. The light control component includes a light transmissive body that has a datum point, a main axis passing through the datum point, a light incident surface that is axis symmetrical relative to the main axis, and a light exit surface that is axis symmetrical relative to the main axis. The light incident surface includes a plurality of annular incident surface portions that form a Fresnel lens configuration and that are concentric with respect to the main axis.

16 Claims, 7 Drawing Sheets

LIGHTING DEVICE AND LIGHT CONTROL COMPONENT THEREOF

CROSS-REFERENCE TO RELATED APPLICATION

This application claims priority to Taiwanese Application No. 101210234, filed on May 29, 2012.

BACKGROUND OF THE INVENTION

1. Field of the Invention

The invention relates to a lighting device, and more particularly to a lighting device suitable for use as a light source.

2. Description of the Related Art

A liquid crystal display (LCD) includes a panel and a backlight module that provides a light source for image display. For uniform illumination of a large area, the conventional backlight module includes a plurality of lighting devices disposed in an area having the same size as the panel and in an array arrangement.

Referring to FIG. 1, a lighting device disclosed in Taiwan patent no. 1352795 includes a light emitting component 5 and a light control component 6. The light emitting component 5 provides an incident light 51.

The light control component 6 is made of a light-transmissive material having a refractive index, and has a datum point 63, a main axis 64 passing through the datum point 63, a light incident surface 61, and a light exit surface 62. The light emitting component 5 is disposed on the datum point 63. The light incident surface 61 is disposed to receive light from the light emitting component 5, allows passage of the incident light 51, and is axis symmetrical relative to the main axis 64. A line connecting the datum point 63 and an arbitrary point disposed on the light incident surface 61 is defined as a first line $R_1$, and an included angle of the main axis 64 and the first line $R_1$ is defined as a first angle $\alpha_1$. The light incident surface 61 is configured such that, when the first angle $\alpha_1$ is smaller than 60 degrees, a length of the first line $R_1$ decreases in a monotonic manner with increase of the first angle $\alpha_1$.

The light exit surface 62 is spaced apart from the light incident surface 61, and is a curved surface that is axis symmetrical relative to the main axis 64. A line connecting an arbitrary point disposed on the light exit surface 62 and the datum point 63 is defined as a second line $R_2$. An included angle of the main axis 64 and the second line $R_2$ is defined as a second angle $\alpha_2$. The light exit surface 62 is configured such that, when the second angle $\alpha_2$ is smaller than 60 degrees, a length of the second line $R_2$ increases in a monotonic manner with increase of the second angle $\alpha_2$. The light control component 6 has light diffusion characteristics through configurations of the light incident surface 61 and the light exit surface 62, and allows passage of light to the panel.

However, better light diffusion requires larger curvature of the light incident surface 61, which results in a concavity with a large depth-width ratio formed in the light incident surface 61, such that the thickness of the light control component 6 is increased, which goes against the trend toward reducing thickness of the backlight module. Moreover, large thickness difference between the portion of the light control component 6 that is disposed close to the main axis 64 and the portion of the light control component 6 that is disposed relatively far from the main axis 64 may result in a junction line during production and a longer forming time.

SUMMARY OF THE INVENTION

Therefore, an object of the present invention is to provide a lighting device that is relatively thinner, that is relatively easy to produce, and that allows uniform light diffusion.

According to one aspect of the present invention, a lighting device comprises:

a base;

a light emitting component disposed on the base and operable to generate light when supplied with electricity; and a light control component disposed on the base, and cooperating with the base to enclose the light emitting component, the light control component including a light transmissive body made of a material having a predetermined refractive index, the light transmissive body having:

a datum point, a main axis passing through the datum point, a light incident surface that is disposed to receive light from the light emitting component and that is axis symmetrical relative to the main axis, the light incident surface including a plurality of annular incident surface portions that form a Fresnel lens configuration and that are concentric with respect to the main axis, and a light exit surface that is spaced apart from the light incident surface and that is axis symmetrical relative to the main axis.

Another object of the present invention is to provide a light control component that is adapted for use in a lighting device so that the lighting device may be made thinner and easily produced, and that allows uniform light diffusion.

According to another aspect of the present invention, a light control component comprises a light transmissive body made of a material having a predetermined refractive index. The light transmissive body has:

a datum point, a main axis passing through the datum point, a light incident surface that is axis symmetrical relative to the main axis, the light incident surface including a plurality of annular incident surface portions that form a Fresnel lens configuration and that are concentric with respect to the main axis, and a light exit surface that is spaced apart from the light incident surface and that is axis symmetrical relative to the main axis.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
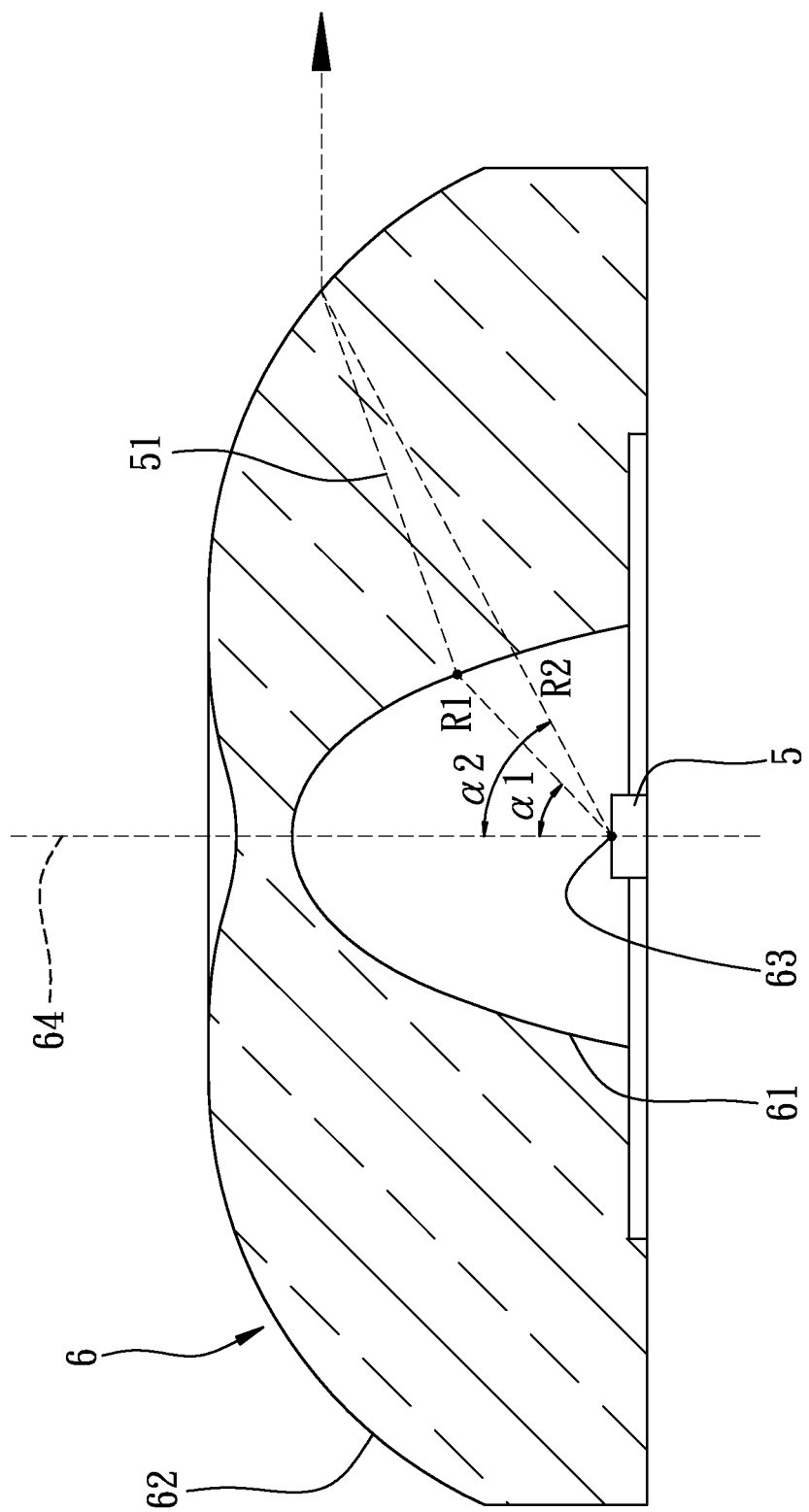
FIG. 1 is a sectional view of a conventional lighting device.
Figure 2:
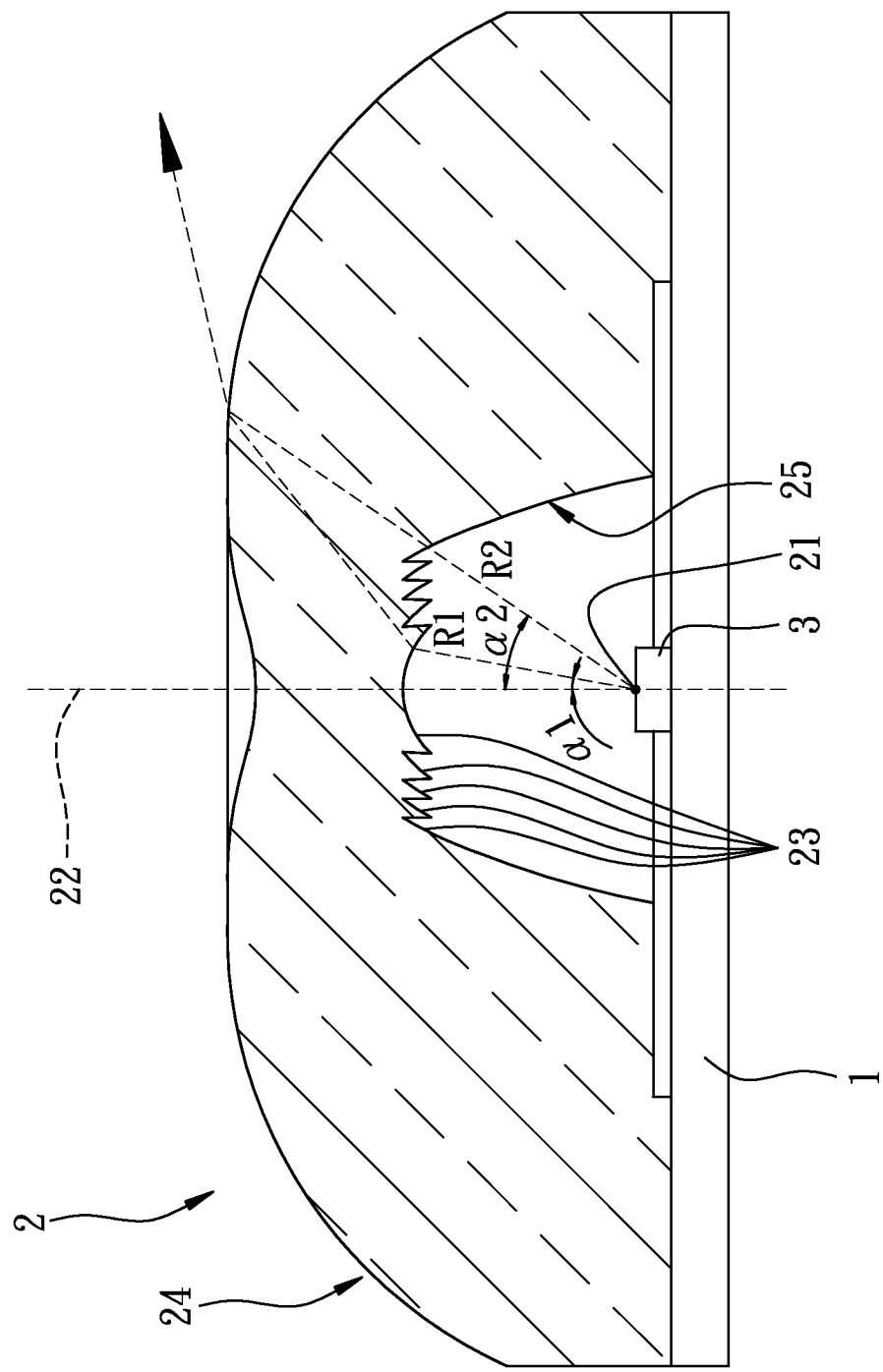
FIG. 2 is a sectional view of a first preferred embodiment of the lighting device according to the present invention.

Referring to FIG. 2, the first preferred embodiment of the lighting device according to this invention is shown to include a base 1, a light control component 2, and a light emitting component 3.

The base 1 is used for placement of the light control component 2 and the light emitting component 3. In general, the base 1 is a printed circuit board (PCB). The light control component 2 includes a light transmissive body made of a material having a predetermined refractive index. The light control component 2 is disposed on the base 1 and cooperates with the base 1 to enclose the light emitting component 3.

Figure 3:
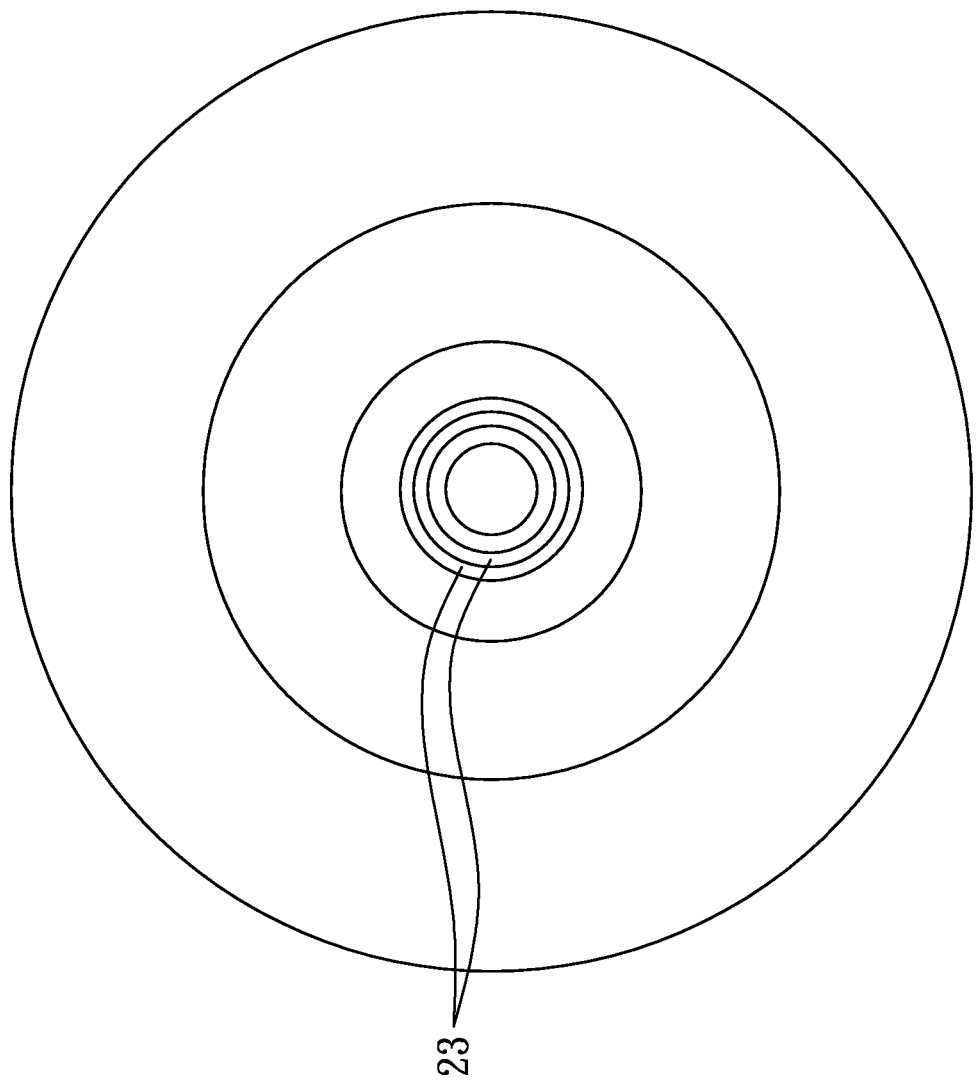
FIG. 3 is a plane view of a light incident surface of the first preferred embodiment.

The light transmissive body has a datum point 21, a main axis 22 passing through the datum point 21, a light incident surface 25 that is disposed to receive light from the light emitting component 3 and that is axis symmetrical relative to the main axis 22, and a light exit surface 24 that is spaced apart from the light incident surface 25 and that is axis symmetrical relative to the main axis 22. The light incident surface 25 includes a plurality of annular incident surface portions 23 that form a Fresnel lens configuration and that are concentric with respect to the main axis 22, as best shown in FIG. 3.

The light emitting component 3 is disposed on the base 1, and is operable to generate light when supplied with electricity via the base 1. Preferably, the light emitting component 3 is disposed close to the datum point 21, so that a portion of the light generated thereby passes through the datum point 21 and propagates along the main axis 22.

Preferably, a first line $R_1$ is defined to be a line connecting the datum point 21 and an arbitrary point on one of the annular incident surface portions 23 of the light incident surface 25, and a first angle $\alpha_1$ is defined to be an included angle of the main axis 22 and the first line $R_1$. The annular incident surface portions 23 are configured such that, with increase of the first angle $\alpha_1$, a length of the first line $R_1$ first decreases in a substantially monotonic manner and then increases in a substantially monotonic manner. The Fresnel lens configuration is thus formed through the annular incident surface portions 23 that are concentric with respect to the main axis 22. Therefore, each of the annular incident surface portions 23 is configured so that when the light is refracted by the annular incident surface portions 23, the light will be deflected to spread out laterally with respect to the main axis 22 during propagation.

A second line $R_2$ is defined to be a line connecting the datum point 21 and an arbitrary point on the light exit surface 24, and a second angle $\alpha_2$ is defined to be an included angle of the main axis 22 and the second line $R_2$. The light exit surface 24 is configured such that, when the second angle $\alpha_2$ is smaller than a predetermined angle, a length of the second line $R_2$ increases in a substantially monotonic manner with increase of the second angle $\alpha_2$. In this embodiment, the predetermined angle is 60 degrees. Therefore, the light exit surface 24 is configured so that when light is refracted by the light exit surface 24, the light will be deflected to spread out laterally with respect to the main axis 22 during propagation. In the vicinity of the main axis 22, the light exit surface 24 may be a convex surface, a concave surface, or a flat surface according to requirements of light diffusion.

To prevent total internal reflection at the light exit surface 24, the length of the second line $R_2$ and the second angle $\alpha_2$ is required to conform with the following equation:

$$\frac{dR_2}{R_2 d\alpha_2} \leq \frac{1}{\sqrt{n^2 - 1}}$$

Where n is the predetermined refractive index of the material.

Figure 4:
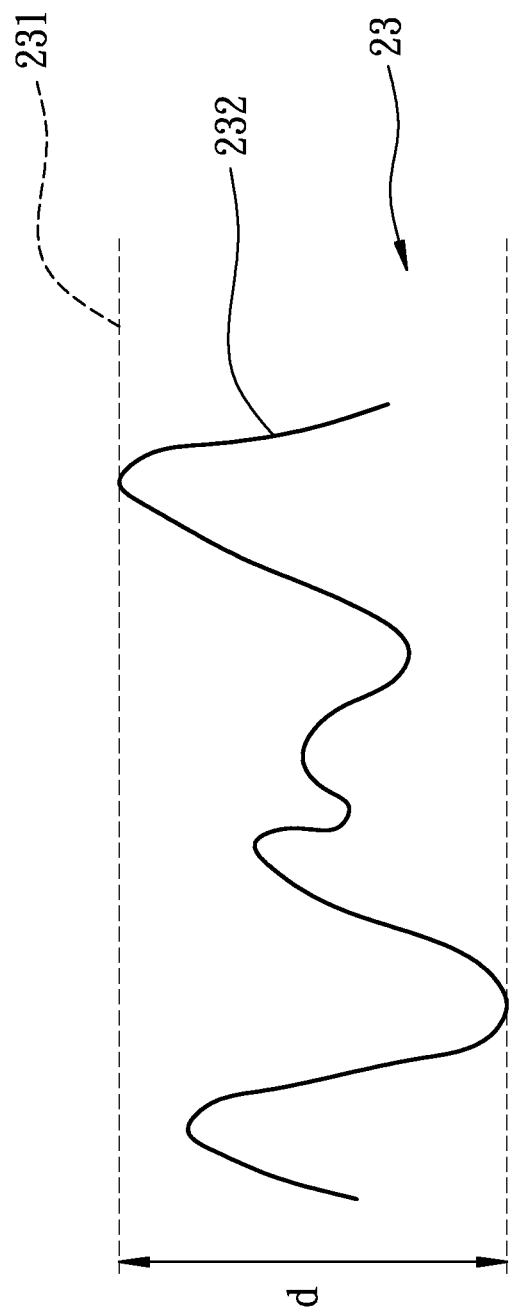
FIG. 4 is a fragmentary enlarged view of the light incident surface shown in FIG. 3.

For uniform light diffusion, focus characteristic of the light control component 2 must be suppressed. FIG. 4 shows a fragmentary enlarged view of one of the annular incident surface portions 23. The annular incident surface portion 23 is a rough surface portion that includes a root part 231 and a projecting part 232. The projecting part 232 is a micro-structure of the incident surface portion 23, and does not affect the substantially monotonic manner of the annular incident surface portion 23 on a macroscopic scale. A height of the annular incident surface portion 23 measured from the root part 231 to a tip of the projecting part 232 ranges from 0.005 millimeter to 0.1 millimeter, while the length change of the first line $R_1$ in one of the annular incident surface portions 23 ranges from 0.05 millimeter to 1 millimeter, such that the projecting part 232 can be ignored on a macroscopic scale. The projecting part 232 may suppress focus characteristic of the light control component 2, thereby leading to uniform light diffusion and alleviating light dispersion.

Since the annular incident surface portions 23 form a Fresnel lens configuration in the vicinity of the main axis 22, height of the annular incident surface portions 23 may be controlled to be within a desired range. In production, the annular incident surface portions 23 favor more uniform thickness of the light control component 2 and higher flowability of plastic injection molding material.

Figure 5:
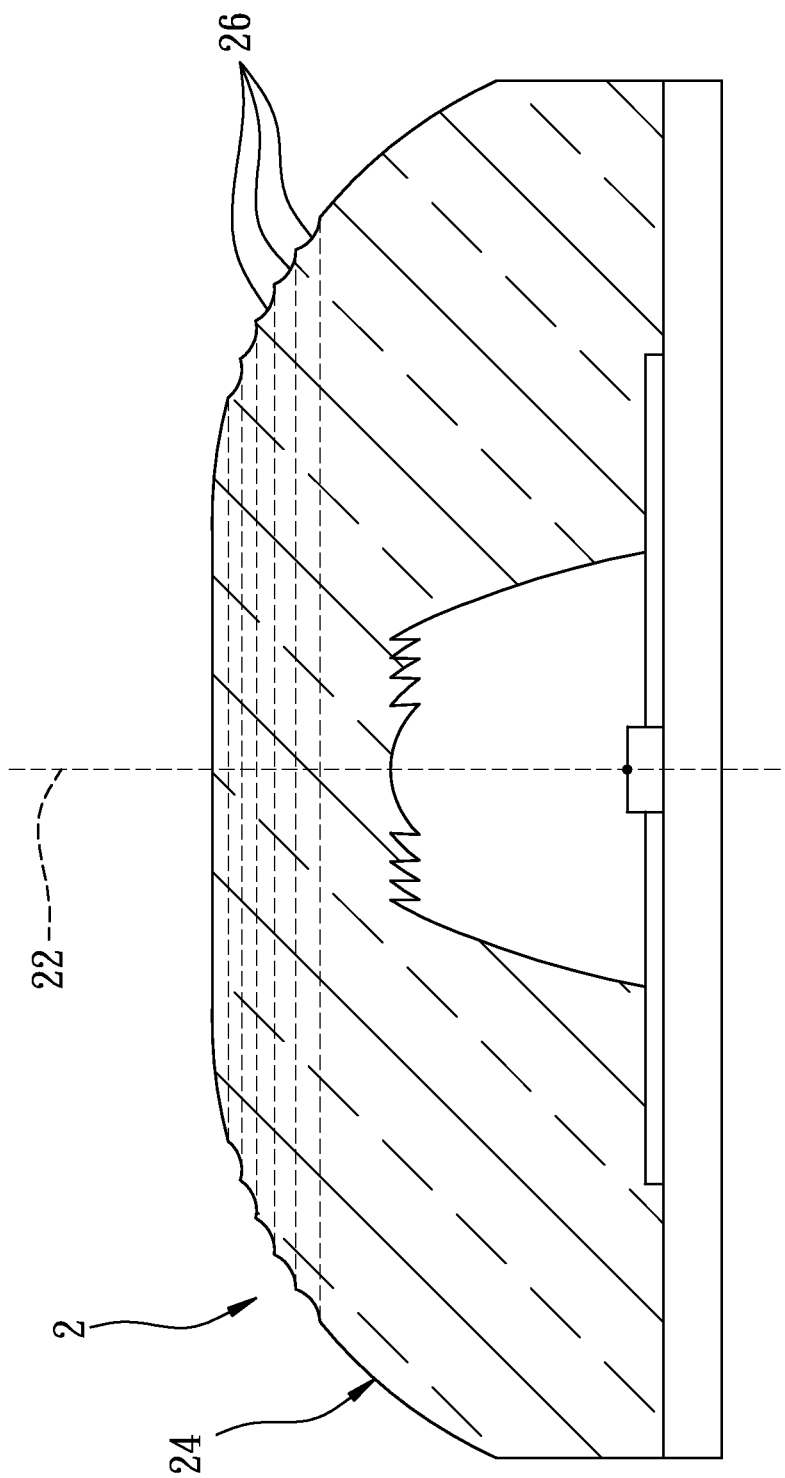
FIG. 5 is a sectional view of a second preferred embodiment of the lighting device according to the present invention.
Figure 6:
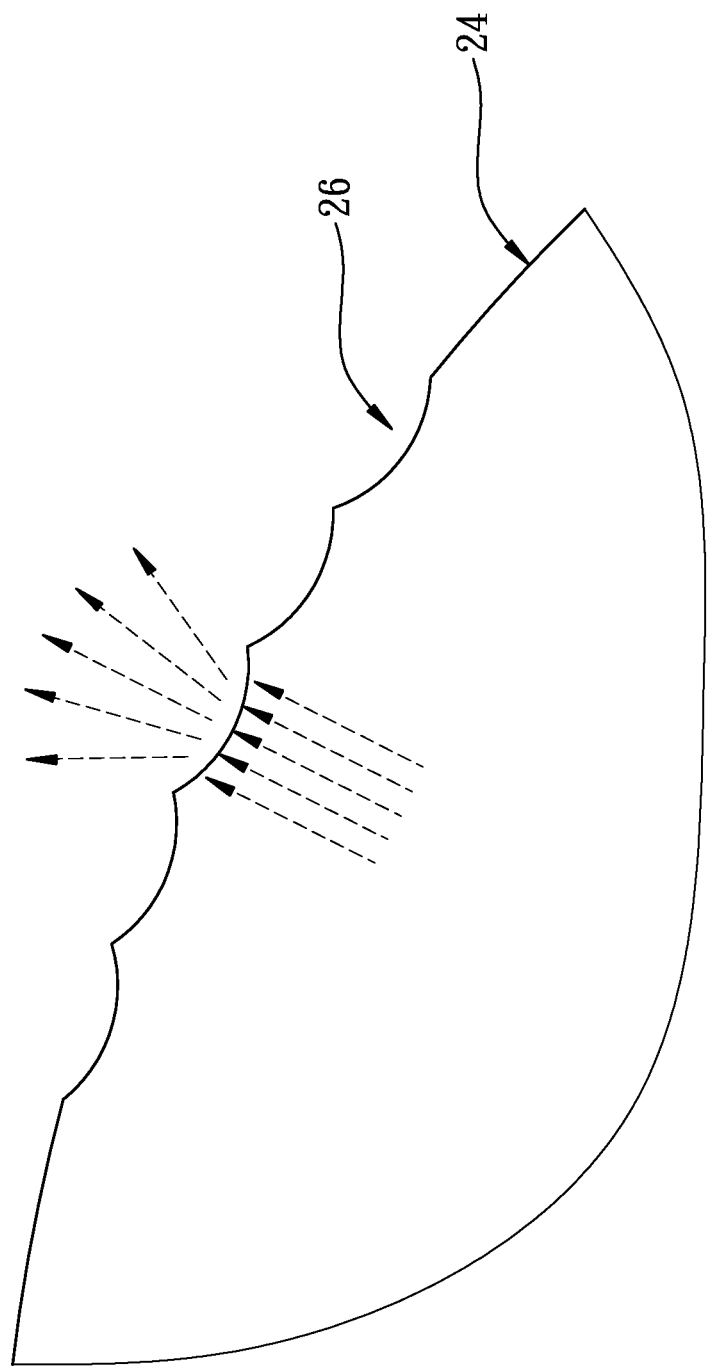
FIG. 6 is a fragmentary enlarged view of a light exit surface of the second preferred embodiment.

Referring to FIGS. 5 and 6, a second preferred embodiment of the lighting device according to this invention is shown to be similar to the first preferred embodiment. The main difference resides in that the light exit surface 24 of the second preferred embodiment includes a plurality of annular grooves 26 that are concentric with respect to the main axis 22 and that are axis symmetrical relative to the main axis 22. The number of the annular grooves 26 is not limited, and the annular grooves 26 may be defined by spherical or aspherical surfaces. The annular grooves 26 are configured to result in partial light scattering, so as to promote light diffusion. Furthermore, the non-smooth refractive surface may alleviate light dispersion.

Figure 7:
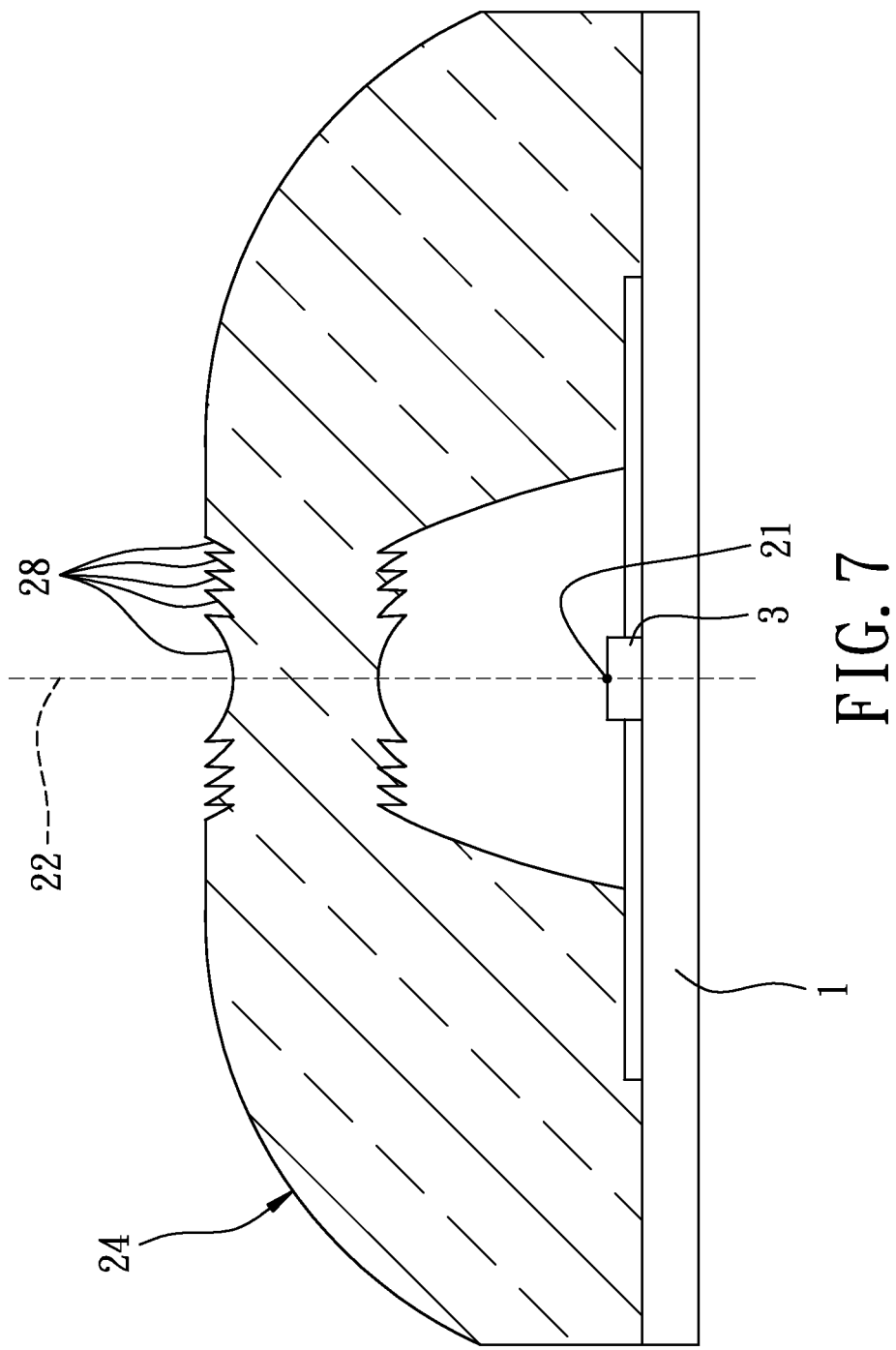
FIG. 7 is a sectional view of a third preferred embodiment of the lighting device according to the present invention.

Referring to FIG. 7, a third preferred embodiment of the lighting device according to this invention is shown to be similar to the first preferred embodiment. The main difference resides in that the light exit surface 24 of the third preferred embodiment includes a plurality of annular exit surface portions 28 that form a Fresnel lens configuration and that are concentric with respect to the main axis 22. Through the Fresnel lens configuration formed by the annular exit surface portions 28, the light exit surface 24 becomes flatter, so that the light control component 2 may have a more uniform thickness in the vicinity of the main axis 22.

To sum up, through the annular incident surface portions 23 forming a Fresnel lens configuration, the height and the thickness difference of the light control component 2 can thus be reduced, resulting in a thinner light control component 2 and making production easier. Moreover, through the surface structure of the annular incident surface portions 23 and the light exit surface 24, light diffusion may be further improved.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A lighting device comprising:
    a base;
    a light emitting component disposed on said base and operable to generate light when supplied with electricity; and a light control component disposed on said base, and cooperating with said base to enclose said light emitting component, said light control component including a light transmissive body made of a material having a predetermined refractive index, said light transmissive body having:
a datum point,
a main axis passing through said datum point,
a light incident surface that is disposed to receive light from said light emitting component and that is axis symmetrical relative to said main axis, said light incident surface including a plurality of annular incident surface portions that form a Fresnel lens configuration and that are concentric with respect to said main axis, and
a light exit surface that is spaced apart from said light incident surface and that is axis symmetrical relative to said main axis.

2. The lighting device as claimed in claim 1, wherein a first line is defined to be a line connecting said datum point and an arbitrary point on one of said annular incident surface portions of said light incident surface, and a first angle is defined to be an included angle of said main axis and the first line, and
wherein each of said annular incident surface portions is configured such that, with increase of the first angle, a length of the first line first decreases in a substantially monotonic manner and then increases in a substantially monotonic manner.

3. The lighting device as claimed in claim 1, wherein a second line is defined to be a line connecting said datum point and an arbitrary point disposed on said light exit surface, and a second angle is defined to be an included angle of said main axis and the second line, and
wherein said light exit surface is configured such that, when the second angle is smaller than a predetermined angle, a length of the second line increases in a substantially monotonic manner with increase of the second angle.

4. The lighting device as claimed in claim 3, wherein the predetermined angle is 60 degrees.

5. The lighting device as claimed in claim 1, wherein each of said annular incident surface portions is a rough surface portion.

6. The lighting device as claimed in claim 1, wherein each of said annular incident surface portions includes a root part and a projecting part, a height of each of said annular incident surface portions measured from said root part to a tip of said projecting part ranging from 0.005 millimeter to 0.1 millimeter.

7. The lighting device as claimed in claim 1, wherein said light exit surface includes a plurality of annular grooves that are concentric with respect to said main axis and that are axis symmetrical relative to said main axis.

8. The lighting device as claimed in claim 1, wherein said light exit surface includes a plurality of annular exit surface portions that form a Fresnel lens configuration and that are concentric with respect to said main axis.

9. A light control component comprising a light transmissive body made of a material having a predetermined refractive index, said light transmissive body having:
a datum point,
a main axis passing through said datum point,
a light incident surface that is axis symmetrical relative to said main axis, said light incident surface including a plurality of annular incident surface portions that form a Fresnel lens configuration and that are concentric with respect to said main axis, and
a light exit surface that is spaced apart from said light incident surface and that is axis symmetrical relative to said main axis.

10. The light control component as claimed in claim 9, wherein a first line is defined to be a line connecting said datum point and an arbitrary point on one of said annular incident surface portions of said light incident surface, and a first angle is defined to be an included angle of said main axis and the first line, and
wherein each of said annular incident surface portions is configured such that, with increase of the first angle, a length of the first line first decreases in a substantially monotonic manner and then increases in a substantially monotonic manner.

11. The light control component as claimed in claim 9, wherein a second line is defined to be a line connecting said datum point and an arbitrary point disposed on said light exit surface, and a second angle is defined to be an included angle of said main axis and the second line, and
wherein said light exit surface is configured such that, when the second angle is smaller than a predetermined angle, a length of the second line increases in a substantially monotonic manner with increase of the second angle.

12. The light control component as claimed in claim 11, wherein the predetermined angle is 60 degrees.

13. The light control component as claimed in claim 9, wherein each of said annular incident surface portions is a rough surface portion.

14. The light control component as claimed in claim 9, wherein each of said annular incident surface portions includes a root part and a projecting part, a height of each of said annular incident surface portions measured from said root part to a tip of said projecting part ranging from 0.005 millimeter to 0.1 millimeter.

15. The light control component as claimed in claim 9, wherein said light exit surface includes a plurality of annular grooves that are concentric with respect to said main axis and that are axis symmetrical relative to said main axis.

16. The light control component as claimed in claim 9, wherein said light exit surface includes a plurality of annular exit surface portions that form a Fresnel lens configuration and that are concentric with respect to said main axis.

* * * * *